Patented Jan. 7, 1947

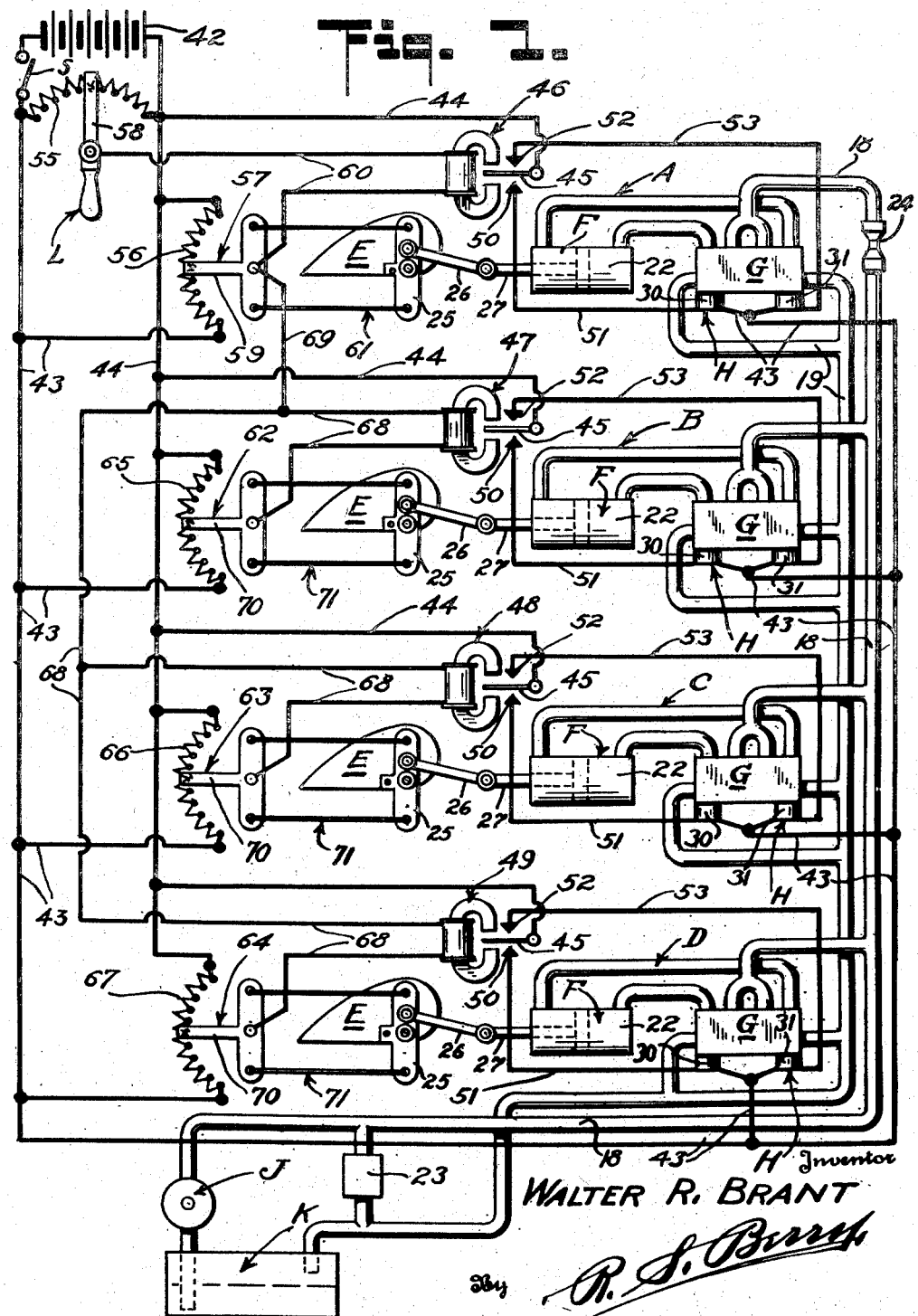

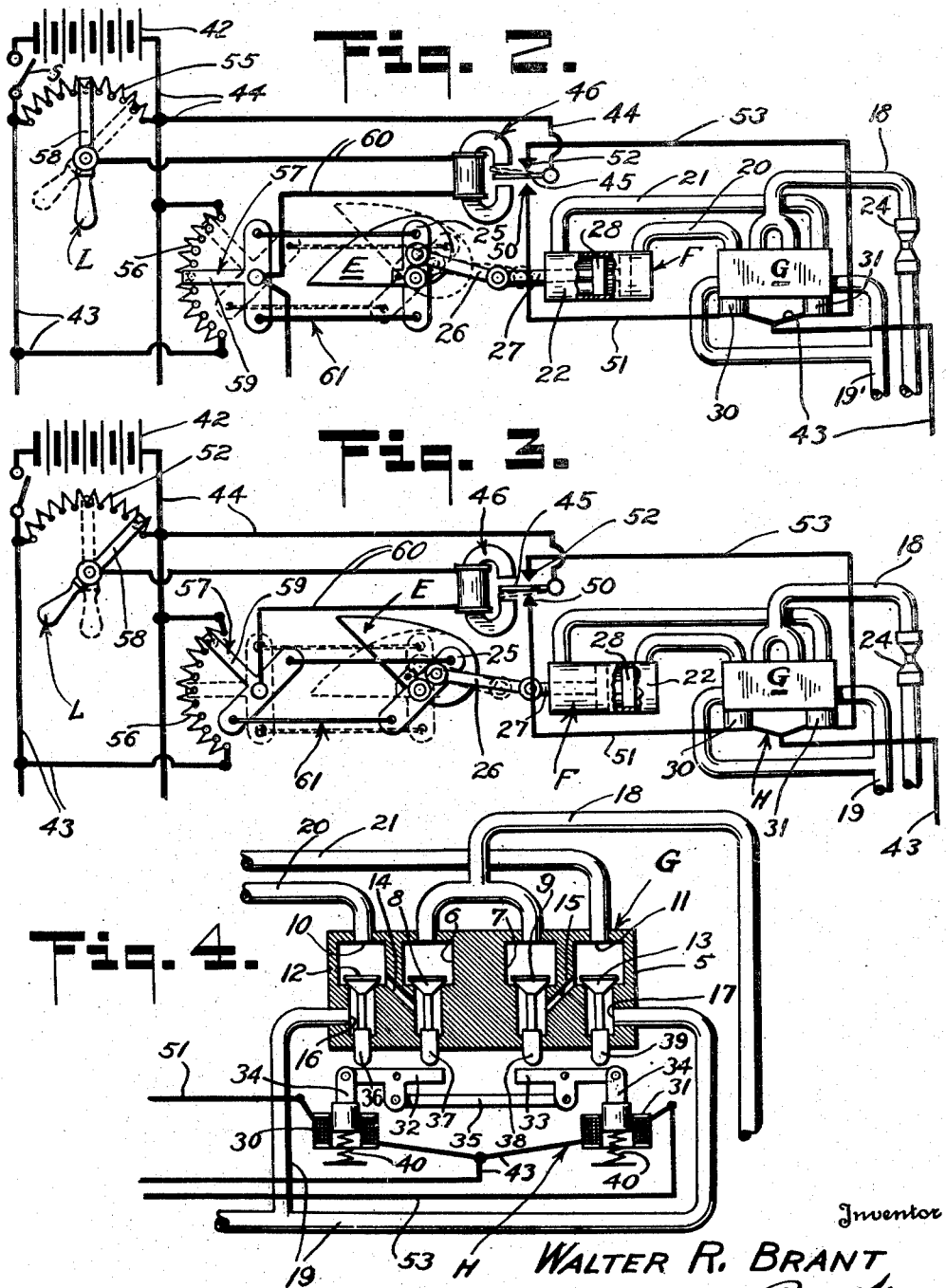

2,413,907

UNITED STATES PATENT OFFICE 2,413,907

ELECTROHYDRAULIC POSITION CONTROL SYSTEM

Walter R. Brant, Glendale, Calif., assignor to Adel Precision Products Corp., a corporation of California Application September 30, 1944, Serial No. 556,645

9 Claims. (Cl. 60—97)

This invention has for its primary object the provision of an electro-hydraulic system which embodies a plurality of electro-hydraulic units of the type shown in my pending application Ser. No. 533,094, filed April 27, 1944, in a novel coordinated arrangement wherein each unit is operatively connected with one of multiple elements or mechanisms such for example as aircraft wing flaps or other aircraft controls which are adapted for simultaneous movement and positioning, and all such units and the elements controlled thereby are subject to a positive and reliable operation and positioning substantially simultaneously by remote control responsive to manipulation of a single control handle, lever or the like.

Another object of my invention is to provide a multiple unit system such as described, in which one of the units serves as a master or "pace-setting" unit for the other units and has the single selective control member of the system directly connected thereto and is arranged so that operation of the master unit commences before operation of the other units, but, before completion of any predetermined operation, causes the other units to operate substantially simultaneously with one another and the master unit to the end that each of said other units will be operated the same predetermined extent as the master unit and complete such operation substantially simultaneously with the completion of the operation of the master unit, thereby assuring predetermined and substantially simultaneous positioning of the mechanisms or elements (wing flaps) operated by the units regardless of any differential loads thereon or other factors tending to prevent synchronized operation of the units and elements controlled thereby.

Another object of my invention is to provide a multiple unit system such as described which makes it unnecessary to position hydraulic control valves and attendant fluid lines and other hydraulic components within the cockpit of an aircraft or in the control station for the system applied other than to aircraft and affords a reliable remote control with the units and components thereof subject to being positioned at the most convenient and suitable location as desired with a view to conservation of materials, reduction of the amount and extent of fluid lines, and a better distribution of the elements of the system for conserving space and weight and increasing the efficiency of the system as a whole.

A further object of my invention is to provide a multiple unit system such as described wherein the particular electrical components of the system and the single electrical control in the cockpit of the aircraft for effecting simultaneous control and operation of all the units, make for an appreciable simplification and reduction of the number of hydraulic components, as well as a conservation of space, and render the system when installed in military aircraft less vulnerable to battle damage.

Yet another object is to provide a multiple unit control system such as described in which the elements actuated by the units are hydraulically locked in any position to which such elements are moved thereby.

While the following description deals specifically with the application of the principles of this invention to the control of wing flaps of an aircraft, it will be appreciated that the invention will be equally applicable for other uses in aircraft such as the actuation of bomb bay doors, landing gear cowl flaps, propeller pitch, etc., and that it is susceptible of uses not connected with aircraft. An example taken at random would be the operation of the flood gates of a dam. Another would be the simultaneous and synchronous remote control of a plurality of hydraulic motors for manipulating a stage floor or stage curtain.

From another aspect the invention contemplates the provision of means wherein by the application of a relatively slight amount of force one can instantly control the application of much greater forces in the manipulation of the control surfaces of huge aircraft, the prototypes of which are beginning to be built and in which, control surfaces remote from each other and from the cabin or cockpit must be subject to instant operation in alsolute synchronism.

Still further, while in the present disclosure there is shown a manually operable master control, such control may be of a type which is automatically responsive to changes in temperature, altitude, attitude or the like. In this respect it will be understood that the present invention is concerned specifically with a system for simultaneous synchronous position control of a plurality of elements through the instrumentality of a single master control.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a schematic view of an electrically controlled multiple hydraulic system embodying my invention;

Fig. 2 is a schematic view of the main or master unit of the system as it would appear when in operation to move the controlled or actuated element from position shown in full lines to position shown in dotted lines and indicating how each of the plurality of connected units is correspondingly operated;

Fig. 3 is a schematic view of the main unit as it would appear when operative to move the controlled or actuated element from the full line to the dotted position, being a movement in the opposite direction compared to Fig. 2:

Fig. 4 is a semi-schematic view of the electrically operated 4-way controlled valve as used in each unit of the system and the operating mechanism therefor.

General description

As shown in the accompanying drawings a system embodying my invention generally includes a main or master electro-hydraulic actuator unit A and a plurality of units B, C and D substantially identical with one another and the master unit and controlled so as to operate substantially simultaneously with the latter.

Each of the units is arranged to operate an element such for example, as an aircraft wing flap E, through the instrumentality of a hydraulic reversible motor F controlled by a 4-way valve G in turn actuated and controlled by electrical mechanism H. A power driven pump J and a reservoir K are common to several units but it is obvious that each unit may have a separate pump and reservoir if desired.

In the master unit A is a manually operable control means L being a part of the electrical mechanism H and operative to control the entire group of units so that they may be substantially simultaneously operated to move the controlled elements E the desired extent within their limits of movement in either direction. In aircraft installations of this system the control means L will be located in the cockpit, but it is obvious it may be located as desired and controlled from the cockpit by any suitable remote control means not shown and that this system may be applied to any equipment or mechanism subject to remote control in the manner herewith provided for.

Hydraulic components

As shown in Fig. 4, the 4-way control valve G of each unit includes a body 5 having "pressure" ports 6 and 7 controlled by valve members 8 and 9; and "cylinder" ports 10 and 11 controlled by valve members 12 and 13. A passage 14 connects ports 6 and 10 and a simmilar passage 15, connects ports 7 and 11. Return ports 16 and 17 open into the cylinder ports 10 and 11.

The pressure ports 6 and 7 of the 4-way valves G of the units A, B, C and D are connected by fluid lines 18 to the pump J as shown in Fig. 1, whereas return lines 19 lead from the return ports 16 and 17 of said valves to the reservoir K, and cylinder lines 20 and 21 lead from ports 10 and 11 to the several motors F of the units. As here shown the motors F are in the form of hydraulic cylinders 22. A relief valve 23 is interposed between lines 18 and 19 near the pump and the reservoir and arranged to open responsive to pressure above the predetermined working pressure of the system, whereby fluid from the pump is returned from line 18 to line 19 to the reservoir without being delivered to the several hydraulic units of the system. In the line 18 near the connection thereof with valve G of the master unit A is a flow restrictor 24 which will retard the flow of fluid to and the action of the motor F of this unit in a manner and for the purpose hereinafter described.

Each of the units has its motor F operatively connected with its associated controlled element E by a drive means such as a crank arm 25 on said element and a link 26 connecting said crank arm with the piston rod 27 of the piston 28 in the cylinder 22, so that responsive to movement of the piston, the element E will be moved to the desired position and will be locked in such position by the hydraulic locking action afforded when the valve members of the associated control valve are closed as shown in Fig. 4.

Electrical components

The 4-way control valve G of each unit is electrically operated by means of electrically responsive devices such for example as the solenoids 30 and 31 and an asociatesd valve actuating mechanism H which responds to the solenoids. As here diagrammatically shown this valve actuating mechanism includes rockers 32 and 33 pivotally connected to the armatures 34 of the solenoids and joined for simultaneous movement by means of a link 35. The rocker 32 is disposed to engage the stems 36 and 37 of the valves 12 and 8 while rocker 33 is disposed to engage the stems 38 and 39 of the valves 9 and 13. Springs 40 in solenoids normally hold the armatures in extended position so that the rockers are disposed as shown in Fig. 4 to allow all the valves to close. When solenoid 30 is energized and retracts its armature 34 the rocker 32 operates to open pressure valve 8 while at the same time the link 35 pushes on and tilts the rocker 33 in the same direction as rocker 32 thereby opening return valve 13. When solenoid 31 is energized and retracts its armature 34 the rocker 33 is tilted so as to open pressure valve 9 while at the same time the link 35 pushes on and tilts the rocker 32 so that it opens return valve 12. It should here be noted that these operations take place substantially simultaneously in the valves of all the units in a manner which will be apparent from the following description of the electrical components of the system.

With reference to Fig. 1 it is seen current for operating the electrical components is supplied from a source such as battery 42 from the negative side of which, as here shown, conductors 43 constituting in effect a single line, are connected to one side of each of the solenoids 30 and 31 throughout the system, whereas from the positive side of the battery, conductors 44 constituting in effect a single line, lead to the electrically conductive armatures 45 of normally open polarized relays 46, 47, 48 and 49 associated with the units A, B, C and D respectively for controlling the solenoids. Contact points 50 on certain corresponding sides (the lower sides as shown in Fig. 1) of the relay armatures 45 are connected by conductors 51 connected to the other sides of the several solenoids 30 so that all of the solenoids 30 will be energized when the relay armatures are moved into contact with the contact points 50. Similar contact points 52 disposed on the other (upper) sides of the relay armatures 45 are connected by conductors 53 to the other sides of the several solenoids 31 so that when the relay armatures 45 are moved to contact the contact points 52 all of the solenoids 31 will be energized.

Before a detailed description is given as to the means for controlling the relays 46, 47, 48 and 49 it should be noted with reference to the following general description that the control of the relays 46, 47, 48 and 49, the several solenoids 30 and 31 and the 4-way valves for the units A, B, C and D is primarily brought about by means of a plurality of coordinated bridge circuits in an interconnected arrangement wherein each of the electrohydraulic units A, B, C and D is controlled by an associated bridge circuit component responsive however to initial operation of the bridge circuit elements of the master unit A, there being a subsequent "follow-up" operation of the other bridge circuits and of the units B, C and D substantially simultaneously with one another. The arrangement is such in the present instance, that the master control L comprises a manually operable variable resistance element such as a potentiometer which is electrically connected in the bridge circuits together with the coils of the several relays and a plurality of motor operated resistance elements (potentiometers) which latter respond only to the movements of the motors F and associated elements E. The coils of the relays of the units B, C and D are connected in parallel with one another but each is connected in series with the coil of the relay of the master unit A, which latter coil is in series with the movable elements of the two variable resistance units in the master unit. The master potentiometer L and the associated motor operated potentiometers when in corresponding positions are in "neutral" and no effective current then flows in the circuits for operating the several relays which therefore remain "open" to maintain the 4-way valves closed. When the master potentiometer L is manipulated to an operative position all of the bridge circuits become unbalanced substantially simultaneously, but the bridge circuit of the master unit due to the manner in which it is arranged and its association with the circuits for the other relays, causes the relay 46 therein to become energized to operate one of the solenoids for controlling the 4-way valve in unit A before the other relays in units B, C and D become operative to close their associated solenoid circuits. As a result of the operation of the relay 46 and the hydraulic components of the master unit A in advance of the other units, the element E operated by the master is moved before the elements E of the other units commence to move. Upon movement of the element E in the master unit, the motor operated potentiometer controlled thereby is moved so that resistance to the flow of current through it is increased to the extent that the energy flow is divided between relay 46 and the other relays sufficiently to energize the later also, whereby the 4-way valves associated therewith, the hydraulic components of units B, C and D and the elements E are substantially simultaneously operated and follow the operation of unit A.

As here provided the flow restrictor 24 is used to limit the flow of operating fluid to the motor F of unit A whereby said motor has a limited operational rate while the motors F of the other units B, C and D can operate at a faster rate and therefore will catch up to but will not get ahead of the operation of the master unit motor F. When any one of the motor-operated potentiometers of units B, C and D is moved to a position corresponding to that of the motor driven potentiometer of unit A, before the latter has equalled the position of the master potentiometer L, the potential in the relay circuit of said one motor driven potentiometer drops and said relay opens the valve actuating circuit of the associated hydraulic unit thereby stopping the motor F of said unit. When the motor operated potentiometer of unit A in continuing its movement toward the position of the master potentiometer L, moves out of the position corresponding to that of said one motor driven potentiometer, potential exchange is effected in favor of the "shut-off" unit, which latter then renews its operation. This control assures that all of the units will be positioned or, disposed in predetermined related positions as determined by operation of unit A. As soon as all of the resistance elements actuated by the mechanisms or elements E reach a position corresponding to that of the master resistance and control element L, the bridge circuits become balanced and the relays become deenergized thereby opening the circuits for the solenoids which operate the 4-way valves which latter then close and hydraulically lock the elements or mechanism E in the position to which they are moved. This control assures that in the event of externally applied loads to any one or more of the operated mechanisms or elements E, tending to cause one or more of them to be moved at a different rate, the system will operate to bring all of the elements with but a momentary delay into corresponding positions as determined by the setting of the master potentiometer L.

Referring now more specifically to the drawings, particularly Fig. 1, it is seen that the bridge circuit for the master unit is arranged with resistance element 55 of the potentiometer of the master control L, connected across the positive and negative conductors 43 and 44 as is also the resistance element 56 of the motor driven potentiometer 57. Forming a part of this primary bridge circuit are the movable elements 58 and 59 of the two potentiometers L and 57 respectively, which are connected in series with the coil of the relay 46 by means of conductors 60. The movable element 59 is actuated by means of a suitable drive means 61 connected with the element E actuated by the unit A. As here shown the movable elements 58 and 59 are normally in a corresponding mid-way position balancing the bridge circuit in the master unit but when in all corresponding positions will also balance said circuit.

The bridge circuit components for the units B, C and D include the motor operated potentiometers 62, 63 and 64, the resistance elements 65, 66 and 67 of which are connected across positive and negative leads 43 and 44 respectively. A series of conductors 68 provide for connecting the movable elements 70 of the potentiometers 62, 63 and 64 and the coils of the relays 47, 48 and 49 in parallel with one another. A conductor 69 is connected to the conductors 68 and the element 59 so that each of the coils of relays 47, 48 and 49 is connected in series with the coil of the master relay 46. A drive means 71 identical with the drive means 61 is provided to connect each of the elements E of the units B, C and D with the movable elements 70 of the potentiometers associated with said units, in the same manner as in the master unit A.

*Operation*

Assuming that the operator manipulates the selective manually operable potentiometer L to dispose the movable element 58 thereof in the dotted line position shown in Fig. 2, the several bridge circuits become unbalanced simultaneously, but the bridge circuit in the master unit energizes the relay 46 therein before the other relays are operated inasmuch as the current will flow from the negative to the positive side of the battery, and the resistance to this flow across the resistance element 55 is such that a greater potential will follow the line of least resistance and flow along the adjacent conductor 43 through the resistance element 56 to the movable element 59, thence through conductor 60 and the coil of relay 45, element 58, right end portion of resistance element 55 and conductor 44 to the other side of the battery. Although at this time the current also flows from the negative line 43 to the bridge circuits of the other units and through the conductor 69 and conductors 60 and coil of relay 46 to complete the bridge circuits, there is a greater potential in the bridge circuit of the master unit which therefore operates before said other relays, and lifts the armature 45 of relay 46 causing said armature to engage contact 52. This will close the circuit for the solenoid 31 for the valve G in the master unit A, through conductors 43, 53, contact 52, armature 46, and conductors 44, thereby retracting the armature 34 of said solenoid so as to rock the rockers 32 and 33 to unseat pressure valve 9 and return valve 12. Pressure fluid from the pump J is now effective through line 18, port 7, open valve 9, passage 15, port 11, cylinder line 21 to the left end of the cylinder 22 of motor F. The piston 28 is now moved to the left (see Fig. 2) and through piston rod 27, link 26 and crank arm 25 moves the element E toward the dotted position shown in Fig. 2. Return fluid from the right end of cylinder 22 flows through line 20, port 10, past open return valve 12, port 16, line 19 back to the reservoir K.

When the element E of the master unit A is moved as next above noted the drive means 61 causes the movable element 59 of potentiometer 57 to move toward its dotted position shown in Fig. 2, thereby increasing the resistance of element 56 and dividing the flow so there is sufficient potential then in the other bridge circuits to operate relays, 47, 48, and 49 simultaneously. The electrical energy now flows from lines 43, the resistance elements 65, 66 and 67 of potentiometers 62, 63 and 64, the movable elements 70 of said potentiometers, the conductors 68 and the coils of said relays, the line 69 connected to the element 59, and lines 60 and the coil of the relay to the positive conductor 44 through element 58 and right hand end portion of resistance element 55.

Upon this simultaneous energization of the relays 47, 48 and 49 the solenoids 31 are operated to manipulate the valves G of units B, C and D in the same manner as valve G of unit A, whereupon the motors F of said units and the elements E controlled thereby are simultaneously operated and elements E move in the same direction as element E of unit A.

It should here be noted that due to the presence of the flow restrictor 24 in the pressure line 18 the flow of fluid to the motor F of the master E is restricted so that said motor cannot exceed a predetermined rate of movement which rate is slower than the rate of movement possible with the motors of units B, C and D. As a result of this flow restriction, the unit A becomes the "pace setter" of the system permitting the other units to equal but not exceed its operational rate and performance. This control is accomplished inasmuch as the motor operated potentiometers 62, 63 and 64 and the relays 47, 48 and 49 associated therewith are controlled by the potentiometer 57 of the master unit as well as the manually operated potentiometer L.

When, for example, the manually operated potentiometer element 58 has been moved to the dotted position shown in Fig. 2 and the unit A has first responded as hereinbefore noted and is moving the motor driven potentiometer element 59 toward a position corresponding to that of element 58 at a limited rate due to the flow restrictor 24, the other units B, C and D in not being limited as to the rate of operation of their motors will, with the loads on the motors being equal, move simultaneously at a faster rate and therefore bring their potentiometer elements simultaneously into the same positions as the motor driven element 59 of potentiometer 57 in the master unit before the latter element has reached a position corresponding to that of the master element 58, and as a result, the motor driven potentiometers 62, 63 and 64 are given resistance value equal to that of potentiometer 57 and the system than is in the same operative condition as when the bridge circuits were initially unbalanced by movement of the master element 58, there being insufficient potential in the circuits of relays 47, 48 and 49 to energize them but sufficient potential in the circuits for relay 46 to keep it energized. The valves G of units B, C and D will now close and shut off the motors F in said units preventing them from "passing" motor F of unit A, until the latter then continuing its operation to bring the potentiometer 57 to the same position as potentiometer L, has moved the element 59 sufficient to cause a division of the flow such that on operating potential is present in the circuits for relays 47, 48 and 49 whereupon these units resume operation and repeat this "catching up" performance until all the motor driven potentiometers have come into the same position as the master potentiometer L.

If one of the motors F of units B, C and D is subjected to a greater load than the other of said units due to wind pressure on the element E, friction or other causes, or for any reason one of said motors be operated at a slower rate, for example in unit C, then units B and D moving at a faster rate will cause the potentiometers 62 and 64 to equal the value of potentiometer 57 of the unit A before the slower actuated potentiometer "catches up" with potentiometers 62 and 64, thereby allowing the slower unit C to substantially "catch up" during the interval that units B and D are stopped.

This controlled operation continues until the units A, B, C and D cease their operation as predetermined by movement of the master manually operable potentiometer L.

Cessation of operation of the motors F and final positioning of the elements E takes place when the movable elements 59, 70, 71 and 72 of units A, B, C and D reach positions corresponding to that of the master control element 58, at which time the resistances in the bridge circuits are equal and the bridge circuits are balanced to the extent that no effective potential is applied to the relays 46, 47, 48 and 49. Thus these relays become deenergized and the armatures 45 move into position to open the circuits for the solenoids 31. When these solenoids are deenergized the springs 40 thereof extend the armatures 34 so as to move the rockers 32 and 33 into position for allowing the valves 9 and 12 to close whereupon the hydraulic fluid is locked in the cylinders 22 and the elements E are therefore effectively held in the positions to which they were moved by the motors.

When it is desired to move the elements E for example from the dotted position shown in Fig. 2 being the full line position shown in Fig. 3 back to the full line position of Fig. 2 which position is shown in dotted lines in Fig. 3, the operator moves the member 58 back to the position shown in full lines in Fig. 1 and in dotted lines in Fig. 3. Current now flows from negative conductors 43 through the left half of resistance element 55, element 58, conductors 60, coil of relay 46, element 59, upper end portion of resistance element 56 to the conductor 44 thus completing the circuit for relay 46 and causing it to operate to move its armature 45 downwardly to engage contact 50 and close the circuit for the solenoid 30, of the master unit. It should here be noted that the element 59 as well as corresponding elements 70 are disposed at this time in the dotted position shown in Fig. 2 so that the resistance elements 56, 65, 66, and 67 offer more resistance to flow of current therethrough from conductors 43, than does the resistance element 55 in the master control unit L. For this reason the effective current flows from line 43 through resistance unit 55 as hereinbefore noted in order to operate the relay 46 as previously stated. When the solenoid 30 of unit A is operated, the rockers 32 and 33 are rocked so that pressure valve 8 and return valve 13 are unseated. Pressure fluid now becomes effective from the pump J, through line 18, port 7, (past valve 8) passages 14, port 10, line 20, right end of cylinder 22 of motor F thereby moving the piston 28 to the right and through the link 26 and crank arm 25 moving the element E toward the dotted position shown in Fig. 3. Return fluid from the cylinder 22 flows through line 21, port 11, valve 13, port 17 and line 19 to the reservoir K. When this operation of unit A has been started, the other units B, C and D commence to operate and continue so to do until the potentiometers thereof reach the same values as the master potentiometer L, in the same manner as previously described. This operation is the same in all respects as the first described operation except that the current flow through the several bridge circuits is reversed as is also the flow of operating fluid to the motor.

It will now be apparent that when the operator moves the member 58 of the selective control means L to the left of the center position shown in Fig. 1, for example the same extent as when moved to the right as shown in dotted lines in Fig. 2, the current flow following the lines of least resistance is from conductor 43 through left end portion of resistance element 55, element 58, conductors 60, and coil of relay 46, element 59 of potentiometer 57, and upper half of the resistance element 56 to the conductor 44 connected to the positive side of the battery. In all other respects the system now operates in the same manner as when the element 58 is moved from its full line position in Fig. 3 to the dotted line position there shown, and the pistons 28 are moved to the left thereby moving elements E downwardly. In other words the current flow in the bridge and other circuits as well as the flow of hydraulic fluid to the motors F is the same as when the control element 58 is moved from its full line position in Fig. 3 to the dotted position there shown.

It should be noted that the system may be connected to the source of current through a switch S which when open renders the system inoperative.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a multiple unit electro-hydraulic system for actuating a plurality of mechanisms substantially simultaneously, a master hydraulic unit and a plurality of similar hydraulic units, each of the hydraulic units including a reversible hydraulic motor, a drive means actuated by the motor for operating one of said mechanisms, and a normally closed valve for controlling the flow of fluid under pressure from a source of supply to operate the motor in either direction; in combination with a flow restrictor for limiting the rate of operation of the motor of the master unit, electrically operable valve actuating devices for the valve of each hydraulic unit which when deenergized cause the valve to close, electrical circuits for said valve actuating devices, a normally open relay operable for selectively closing said circuits and operating said devices for each valve, and control means for selectively operating the relays including a manually operable variable resistance unit, a motor operated resistance unit for each hydraulic unit, a drive means for operatively connecting each of the motor operated variable resistance units with its associated motor, and a relay control circuit connecting the resistance elements of all of said variable resistance units in parallel and connecting the movable element of said manually operable resistance unit in series with the relay and the movable element of the motor operated resistance unit associated with the master hydraulic unit; each of the similar hydraulic units having its associated relay and movable element of its associated motor operated resistance unit independently connected in series with the relay and movable resistance element associated with said master unit, whereby when all the variable resistance units are in corresponding positions of adjustment, the relays will open the circuits for said valve actuating devices, but upon movement of said manually operable unit to a position at variance with the positions of the motor operated resistance units, the relay of the master unit will operate first and close a circuit for the master unit valve actuating devices whereby such valve will be operated to direct fluid for operating the motor in a direction as determined by the movement of the manual resistance unit, and thereafter, and during said operation of the master unit motor, the relays of the other hydraulic unit will be simultaneously actuated to effect operation of the valves of the other units for substantially simultaneously operating the motors thereof in correspondence to the operation of the master unit motor; the said relay control circuits also operating when the motor actuated resistance units are moved by their associated motors to positions corresponding to that to which the manually operable resistance unit has been moved, to deenergize said relays and open the circuits for said valve actuating devices whereby the latter will operate said valves to shut off flow of hydraulic fluid to and stop said motors.

2. In a multiple unit electro-hydraulic system for operating a plurality of mechanisms substantially simultaneously, a master hydraulic unit, a second hydraulic unit, each of the hydraulic units including a reversible hydraulic motor, a drive means actuated by the motor unit for actuating one of said mechanisms, and a normally closed flow reversing valve for directing fluid under pressure from a source of supply for operating said motor in either direction; in combination with a flow restricting means for limiting the rate of operation of the motor of the master unit, electrically operable valve actuating devices for each valve operating when deenergized to close the valve, electrical circuits for said valve actuating devices, normally open relays operable for selectively closing the circuits for said devices; and control means for selectively operating the relays including a manually operable potentiometer, a motor operated potentiometer for each hydraulic unit, a drive means for driving each motor operated potentiometer responsive to operation of its associated motor in accordance with the manipulation of said manually operable potentiometer; and a relay control circuit connecting the resistance elements of all said potentiometers in parallel and connecting the movable element of said manually operable potentiometer in series with the relay and the movable element of the motor operated potentiometer associated with the master hydraulic unit, the second hydraulic unit having its associated relay and the movable element of its associated motor operated potentiometer connected in series with the relay and the movable potentiometer element associated with said master hydraulic unit whereby when the manually operated potentiometer is moved to a position at variance with the positions of the motor operated potentiometers, the relay of the master unit will operate in advance of the other relay and close a circuit for one of the valve actuating devices of the master unit whereby the master unit valve will direct fluid for operating the motor thereof and during such operation of the master unit motor the said relay control circuits will direct electrical energy for energizing the other relay and operating the other valve so that the other unit motor will operate substantially simultaneously with the motor of the master unit unitl the motor operated potentiometers are moved to positions corresponding to that of the manually operated potentiometer at which time said potentiometers will operate to deenergize said relays and the valve actuating devices so that said valves will close substantially simultaneously.

3. In a hydraulic system comprising a source of hydraulic pressure, a pair of reversible hydraulic motors, a flow reversing valve means interposed between each of said motors and said source of pressure, and means interposed between said source of pressure and one of said motors for restricting the flow of pressure fluid thereto compared to the flow to the other motor; a remote control apparatus comprising a source of electrical energy, a circuit comprising a manually operated potentiometer, a potentiometer operated by each of said motors, the resistance elements of said potentiometers being connected in parallel, a pair of polarized relays having their field coils connected in series between the contacts of adjacent potentiometers, and a pair of valve actuating solenoids for each of said flow reversing valves, each contact point of said relays and one of said solenoids being connected in series parallel relation with said source of energy, the movable element of the manually operated potentiometer, one of said relay field coils and the movable element of one of the motor operated potentiometers being connected in series with said source of electrical energy and arranged to control the motor to which the flow of fluid is restricted, the field coil of the other relay and the movable contact element of the other motor operated potentiometer being connected in series with the field coil of said one relay and said movable element of said manually operable potentiometer.

4. In a multiple unit electro-hydraulic system for operating a plurality of mechanisms substantially simultaneously, a master hydraulic unit, a second hydraulic unit, each of the hydraulic units including a reversible hydraulic motor, a drive means actuated by the motor unit for actuating one of said mechanisms, and a normally closed flow reversing valve for directing fluid under pressure from a source of supply for operating said motor in either direction; in combination with a flow restricting means for limiting the rate of operation of the motor of the master unit, electrically operable valve actuating devices for each valve operating when deenergized to close the valve, electrical circuits for said valve actuating devices, a normally open relay operable for selectively closing the circuits for said devices in each of said units, and control means for selectively operating the relays including a manually operable potentiometer, a motor operated potentiometer for each hydraulic unit, a drive means for driving each motor operated potentiometer responsive to operation of its associated motor in accordance with the manipulation of said manually operable potentiometer; and a relay control circuit connecting the resistance elements of all said potentiometers in parallel and connecting the movable element of said manually operable potentiometer in series with the relay and the movable element of the motor operated potentiometer associated with the master hydraulic unit, the second hydraulic unit having its associated relay and the movable element of its associated motor operated potentiometer connected in series with the relay and the movable potentiometer element associated with said master hydraulic unit whereby when the manually operated potenticmeter is moved to a position at variance with the positions of the motor operated potentiometers, the relay of the master unit will operate in advance of the other relay and close a circuit for one of the valve actuating devices of the master unit whereby the master unit valve will direct fluid for operating the motor, and thereafter and during such operation of the master unit motor the said relay control circuits will direct electrical energy for energizing the other relay and operating the other valve so that the motor of the other unit will operate substantially simultaneously with and in the same direction as the motor of the master unit until the motor operated potentiometers are moved to positions corresponding to that of the manually operated potentiometer at which time said potentiometers will deenergize said relays and the valve actuating devices so that said valve will close substantially simultaneously.

5. In a multiple unit electro-hydraulic system for operating a plurality of mechanisms substantially simultaneously, a master hydraulic unit, a second hydraulic unit, each of the hydraulic units including a reversible hydraulic motor, a drive means actuated by the motor unit for actuating one of said mechanisms, and a normally closed flow reversing valve for directing fluid under pressure from a source of supply for operating said motor in either direction; in combination with a flow restricting means for limiting the rate of operation of the motor of the master unit, electrically operable valve actuating devices for each valve operating when deenergized to close the valve, electrical circuits for said valve actuating devices, a normally open relay opposable for selectively closing the circuits for said devices in each of said units, and control means for selectively operating the relays including a manually operable potentiometer, a motor operated potentiometer for each hydraulic unit, a drive means for driving each motor operated potentiometer responsive to operation of its associated motor in accordance with a previous manipulation of said manually operable potentiometer, and a relay control circuit connecting the resistance elements of all said potentiometers in parallel and connecting the movable element of said manually operable potentiometer in series with the relay and the movable element of the motor operated potentiometer associated with the master hydraulic unit, the second hydraulic unit having its associated relay and the movable element of its associated motor operated potentiometer connected in series with the relay and the movable potentiometer element associated with said master hydraulic unit whereby when the manually operated potentiometer is moved to a position at variance with the positions of the motor operated potentiometers, the relay of the master unit will operate in advance of the other relay and close a circuit for one of the valve actuating devices of the master unit whereby the master unit valve will direct fluid for operating the motor, and thereafter and during such operation of the master unit motor, the said relay control circuits will direct electrical energy for energizing the other relay and operating the other valve so that the other unit motor will operate substantially simultaneously with the motor of the master unit until the motor operated potentiometers are moved to positions corresponding to that of the manually operated potentiometer at which time said potentiometers will operate to deenergize said relays and the valve actuating devices so that said valve will close substantially simultaneously, the said valves operating when closed to hydraulically lock the motors against movement responsive to nonhydraulic forces applied thereto.

6. In a multiple unit electro-hydraulic system for operating a plurality of mechanisms substantially simultaneously, a master hydraulic unit, a second hydraulic unit, each of the hydraulic units including a reversible hydraulic motor, a drive means actuated by the motor unit for actuating one of said mechanisms, and a normally closed flow reversing valve for directing fluid under pressure from a source of supply for operating said motor in either direction; in combination with a flow restricting means for limiting the rate of operation of the motor of the master unit, electrically operable valve actuating devices for each valve operating when deenergized to close the valve, electrical circuits for said valve actuating devices, a normally open relay operable for selectively closing the circuits for said devices in each of said units; and control means for selectively operating the relays including a manually operable potentiometer, a motor operated potentiometer for each hydraulic unit, a drive means for driving each motor operated potentiometer responsive to operation of its associated motor in accordance with a predetermined manipulation of said manually operable potentiometer, and a relay control circuit connecting the resistance elements of all said potentiometers in parallel and connecting the movable element of said manually operable potentiometer in series with the relay and the movable element of the motor operated potentiometer associated with the master hydraulic unit, the second hydraulic unit having its associated relay and the movable element of its associated motor operated potentiometer connected in series with the relay and the movable potentiometer element associated with said master hydraulic unit whereby when the manually operated potentiometer is moved to a position at variance with the positions of the motor operated potentiometers, the relay of the master unit will operate in advance of the other relay and close a circuit for one of the valve actuating devices of the master unit whereby the master unit valve will direct fluid for operating the motor, and before completion of such operation of the master unit motor, the said relay control circuits will direct electrical energy for energizing the other relay and operating the other valve so that the other unit motor will operate substantially simultaneously with the motor of the master unit until the motor operated potentiometers are moved to positions corresponding to that of the manually operated potentiometer at which time said potentiometers will operate to deenergize said relays and the valve actuating devices so that said valves will close substantially simultaneously, said potentiometers, relays, valves and actuating devices and associated circuits being arranged so that a directional adjustment of said manually operable potentiometer will be followed by operation of said motors in a corresponding direction and to an extent predetermined by the extent of adjustment of the manually operable potentiometer.

7. In a multiple unit electro-hydraulic system for operating a plurality of mechanisms substantially simultaneously, a master hydraulic unit, a second hydraulic unit, each of the hydraulic units including a reversible hydraulic motor, a drive means actuated by the motor unit for actuating one of said mechanisms, and a normally closed flow reversing valve for directing fluid under pressure from a source of supply for operating said motor in either direction; in combination with a flow restricting means for limiting the rate of operation of the motor of the master unit, electrically operable valve actuating devices for each valve operating when deenergized to close the valve, electrical circuits for said valve actuating devices, normally open relays operable for selectively closing the circuits for said devices; and control means for selectively operating the relays including a manually operable potentiometer, a motor operated potentiometer for each hydraulic unit, a drive means for driving each motor operated potentiometer responsive to operation of its associated motor in accordance with the manipulation of said manually operable potentiometer; and a relay control circuit connecting the resistance elements of all said potentiometers in parallel and connecting the movable element of said manually operable potentiometer in series with the relay and the movable element of the motor operated potentiometer associated with the master hydraulic unit, the second hydraulic unit having its associated relay and the movable element of its associated motor operated potentiometer connected in series with the relay and the movable potentiometer element associated with said master hydraulic unit whereby when the manually operated potentiometer is moved to a position at variance with the positions of the motor operated potentiometers, the relay of the master unit will operate in advance of the other relay and close a circuit for one of the valve actuating devices of the master unit whereby the master unit valve will direct fluid for operating the motor thereof and during such operation of the master unit motor the said relay control circuits will direct electrical energy for energizing the other relay and operating the other valve so that the other unit motor will operate substantially simultaneously with the motor of the master unit until the motor operated potentiometers are moved to positions corresponding to that of the manually operated potentiometer at which time said potentiometers will operate to deenergize said relays and the valve actuating devices so that said valves will close substantially simultaneously, said relay control circuits and associated elements therein also operating when the motor operated potentiometer of said second unit reaches a position corresponding to that of the motor operated unit of the master unit, to deenergize the relay of said second unit thereby stopping the hydraulic operation thereof until the motor operated potentiometer of the master unit is moved out of a position corresponding to that of said second unit potentiometer.

8. In a multiple unit electro-hydraulic system for operating a plurality of mechanisms substantially simultaneously, a master hydraulic unit, a second hydraulic unit, each of the hydraulic units including a reversible hydraulic motor, a drive means actuated by the motor unit for actuating one of said mechanisms, and a normally closed flow reversing valve for directing fluid under pressure from a source of supply for operating said motor in either direction; in combination with a flow restricting means for limiting the rate of operation of the motor of the master unit, electrically operable valve actuating devices for each valve operating when deenergized to close the valve, electrical circuits for said valve actuating devices, normally open relays operable for selectively closing the circuits for said devices; and control means for selectively operating the relays including a manually operable potentiometer, a motor operated potentiometer for each hydraulic unit, a drive means for driving each motor operated potentiometer responsive to operation of its associated motor in accordance with the manipulation of said manually operable potentiometer; and relay control circuits connecting the resistance elements of said potentiometers in parallel as well as connecting the movable contact member of each of said motor operated potentiometers in series with the coil of its associated relay, while also connecting the coil of the relay of the second unit in series with the coil of the relay in the master unit, so that when the manually operable potentiometer is in a position at variance to that of the motor operated potentiometers, and the motor operated potentiometer in the second unit reaches a position corresponding to that of the motor operated potentiometer in the master unit, the relay in the second unit will be deenergized and the hydraulic operators of the second unit will close, but said relay will renew its operation when the motor operated potentiometer in the master unit moves out of position corresponding to that of the second unit potentiometer, the operation of the master and second units ceasing when the motor driven potentiometers reach positions corresponding to that of said manually operable potentiometer.

9. In an electro-hydraulic system for simultaneously changing the position of elements to be controlled by the system, responsive to manipulation of a master control element, the combination of a hydraulic system including a source of fluid pressure, a plurality of reversible hydraulic motors connected to said source of fluid pressure, a flow reversing valve for controlling each motor, a flow restricting means interposed between one of said valves and said source of pressure, together with electrically operated control means which comprises a source of electrical energy, a master potentiometer, a secondary potentiometer associated with each motor, a drive means for actuating the secondary potentiometers responsive to operation of said motors, a polarized relay associated with each motor; the resistance elements of said potentiometers being connected in parallel with said electrical energy source and the movable element of said master potentiometer being connected in series with the field coil of the relay associated with the motor to which the pressure flow is restricted, and the movable element of the secondary potentiometer which is associated with said flow-restricted motor; each of the other reversible motors having the movable element of its associated potentiometer and the field coil of its associated relay connected in series with the field coil of the flow-restricted motor and with the movable element of said master potentiometer, a pair of solenoids being connected with each valve for selective operation of said valves, said solenoids being connected to said electrical source for selective energization responsive to energization of said field coils; whereby upon shifting said master potentiometer there will be produced an unbalance between it and the motor operated potentiometer of the flow-restricted motor, and such motor will be operated with incident movement of its associated secondary potentiometer until the latter restores a balance, said unbalance causing simultaneous operation of the other motors whereby they will follow the restricted motor in a step by step movement until all the potentiometers provide a balance in the electrical system.

WALTER R. BRANT.